(12) United States Patent
Hale et al.

(10) Patent No.: US 8,316,577 B2
(45) Date of Patent: Nov. 27, 2012

(54) FISH SET LINE

(76) Inventors: Lonnie Otis Hale, Myrtle Beach, SC (US); Jeffrey Benton Hale, Smithville, TN (US)

( * ) Notice: Subject to any disclaimer, the term of this patent is extended or adjusted under 35 U.S.C. 154(b) by 304 days.

(21) Appl. No.: 12/834,948

(22) Filed: Jul. 13, 2010

(65) Prior Publication Data
US 2010/0269397 A1     Oct. 28, 2010

Related U.S. Application Data

(63) Continuation-in-part of application No. 11/688,351, filed on Mar. 20, 2007, now abandoned.

(60) Provisional application No. 60/803,593, filed on May 31, 2006.

(51) Int. Cl.
*A01K 91/10* (2006.01)
*A01K 93/02* (2006.01)

(52) U.S. Cl. ........................... 43/43.11; 43/17.5; 43/43.1

(58) Field of Classification Search ............... 43/4, 17.5, 43/43.1, 43.11
See application file for complete search history.

(56) References Cited

U.S. PATENT DOCUMENTS

| | | | |
|---|---|---|---|
| 5,010,678 A | 4/1991 | Peck et al. |
| 5,205,061 A | 4/1993 | Echols, Jr. |
| 6,408,561 B1 | 6/2002 | Winter |
| 6,467,939 B2 | 10/2002 | Deutsch et al. |

*Primary Examiner* — David Parsley
(74) *Attorney, Agent, or Firm* — James Addison Barry, Jr.

(57) ABSTRACT

The fish set line 100 is an apparatus or kit that a fisherman may use: to be alerted when a fish has been caught; to provide for adjusting the proper line length; and to provide for storing the fishing combination. The fish set line 100 may include a housing 110; an attachment 120 and an attachment line 130 for attaching the fish set line 100 with a fixed structure; a swivel 136 attached with the attachment line 130; a motion activated light 140 for detecting motion related to fish engagement; a fish hook 150; a hook line 152; a weight 158; a hook line shaft 160; and a locking crank 162 for reeling in the hook line 152 and locking the hook line 150 in place.

6 Claims, 6 Drawing Sheets

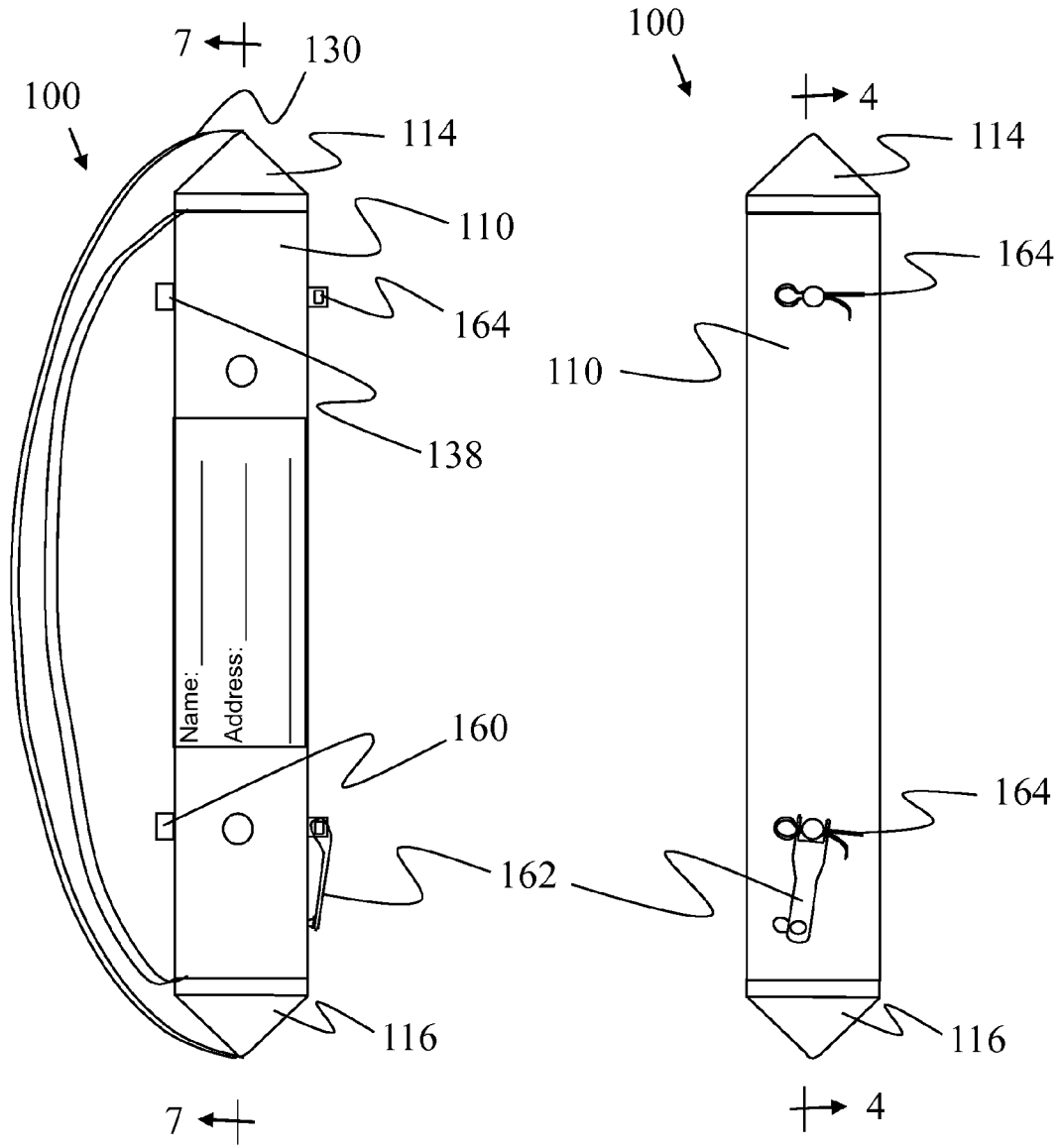

FISH SET LINE

CROSS-REFERENCE TO RELATED APPLICATIONS

The present application is a Continuation-In-Part of the parent U.S. patent application Ser. No. 11/688,351, filed Mar. 20, 2007, titled Fish Set Line, currently pending which claims the benefit of U.S. Provisional Application Ser. No. 60/803,593, filed May 31, 2006, titled Fish Set Line. The present application is related by the same inventors for both applications, Lonnie Otis Hale and Jeffrey Benton Hale. The parent applications U.S. patent application Ser. No. 11/688,351, filed Mar. 20, 2007 and U.S. patent application Ser. No. 11/688,351, filed Mar. 20, 2007 are hereby incorporated in its entirety by reference. In addition, U.S. Pat. No. 6,467,939 issued Oct. 22, 2002 is incorporated by reference.

FIELD OF THE INVENTION

The present invention relates to the field of fishing including an apparatus and a method of hooking and gathering fish. More specifically, this invention relates to an apparatus and a method of fishing without the use of conventional rods or poles.

BACKGROUND OF THE INVENTION

Background: Most fish are caught in the United States with a rod and reel. There are numerous combinations of rods and reels available to anglers. However, some fishermen chose to use a simpler alternative of fishing called limblining. Here a length of strong line is tied to a limb hanging over the water. The length of the line is adjusted to extend into the water the desired depth. A strong hook is tied to the opposite end of the line along with enough weight so the line will hang vertically beneath the limb. The hook is then baited and the fisherman waits for the catch. Using the current methods of limblining, there are several disadvantages that keep numerous people from limblining. They have difficulty keeping the catch alive; the laws in some states require the fisherman to tag his limbline; many fishermen forget where they put their line; the fisherman's lines get tangled; the fishermen may have a wad of tangled line in their lap in the boat; as a result many rely on using a float instead of hanging a line above the water on a branch or limb; and others prefer to troll. It would be desirable to have an apparatus or a kit that a fisherman could use to minimize the chance of getting the line entangled in the trees and brush; to conveniently adjust the proper length of line; to conveniently store this fishing combination; and to be alerted when a fish has been caught on the hook.

BRIEF DESCRIPTION OF THE DRAWINGS

These and other features, aspects, and advantages of the invention will become better understood with regard to the following description, appended claims, and accompanying drawings where:

FIG. 2 is a front view of the fish set line apparatus with caps in place and handle locked in place;

FIG. 3 is a side view of the fish set line apparatus with caps in place and handle locked in place;

DETAILED DESCRIPTION OF THE INVENTION

The present invention relates to the field of fishing including an apparatus and a method of hooking and gathering fish. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

Figure 1:
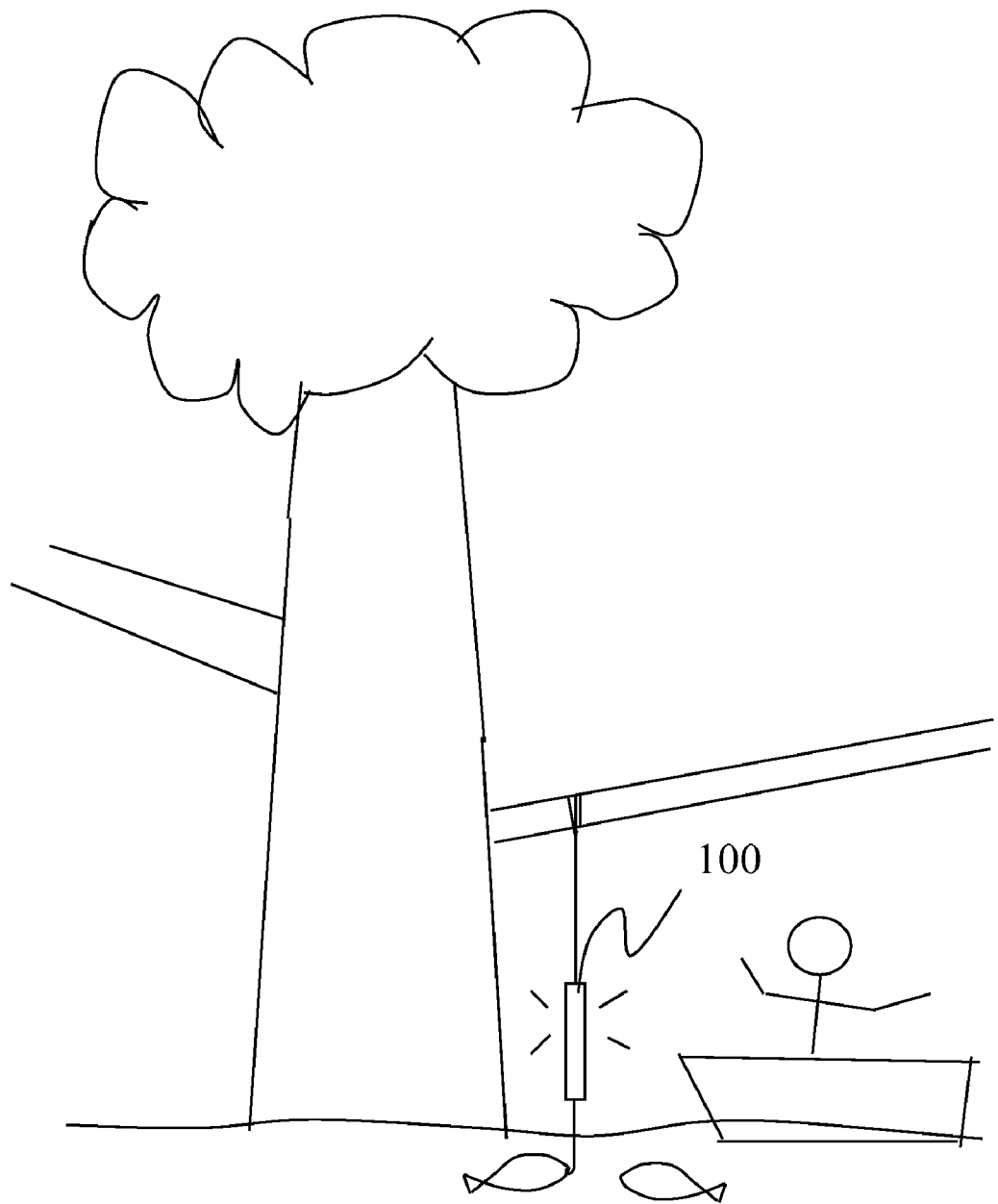
FIG. 1 is an illustration of the fish set line in use according to the present invention.

Overview of the Invention:

Shown in FIG. 1, the present invention is a fish set line combination apparatus 100 that will allow a fisherman to hook and gather fish without constantly monitoring the fishing process. With the fish set line, the fisherman may attach the fish set line to a tree limb or other secure object, reel out the appropriate amount of line, bait the hook, and occasionally check the fish set line to see if light has been activated thus indicating a possible fish catch. Extendable parts of the apparatus may be conveniently stored in the housing. The fish set line may be used around brush and trees, and may include a buoyant means so that it floats to avoid loss of the apparatus if dropped in the water.

Description of the Invention:

As depicted in FIGS. 2 through 6, the fish set line 100 is a combination apparatus or kit that a fisherman may use: to be alerted when a fish has been caught; to minimize the chance of getting the line entangled in the trees and brush; to provide a convenient means to adjust the proper line length; and to provide a convenient means of storing the fishing combination. The fish set line 100 is a convenient way to fish without the use of a fishing rod or pole. The apparatus 100 may include a housing means 110 for the fish set line 100; an attachment means 120 for attaching the fish set line 100 with a fixed structure for securing the fish set line apparatus 100; an attachment line 130 to attach the housing means 110 with the attachment means 120; a first end of the attachment line 132 may be attached with the attachment means 120; a swivel 136 attached with the attachment line 130 disposed between the housing means 110 and the attachment means 120 to maintain horizontal alignment of the fish set line 100; a motion activated light means 140 attached with the housing means 110 that will detect motion related with fish engagement instead of wave action from the water and alert the fisherman of a fish catch; a fish hook 150; a hook line 152 wherein a first end of the hook line 154 is attached with the fish hook 150; a weight 158 attached with the hook line 152 near the hook 150 to weight the hook line 150 down in the water; a hook line shaft 160 attached with the housing means 110 wherein a second end hook line 156 of the hook line 150 attaches with the hook line shaft 160; and a locking crank means 162 is attached with the hook line shaft 160 for reeling in the hook line 152 and locking the hook line 150 in place.

The housing means or housing 110 for the fish set line 100 may be constructed with numerous means. Various shaped tubing including but not limited to square, rectangular, or round tubing may be used with materials such as plastic, PVC, or metal or similar materials. In one embodiment, a top removable cap 114 and a bottom removable cap 116 may be included and disposed with the top cap 114 and bottom cap 116 inserted into the corresponding portion of the housing 110 to store the attachment line 130 and attachment means 120 in the top portion of the housing as well as the hook 150, hook line 152, and weight 158 in the bottom portion of the housing means 110. In another embodiment, the attachment line 130 may be disposed through an aperture in the top cap 114 and the bottom cap 116. This configuration may help prevent the loss of the top cap 114 and the bottom cap 116. In addition, the attachment line 130 may also serve as a handle for carrying the fish set line 100 in this configuration. The housing 110 may also include a label for identifying the users name and address as illustrated in FIG. 4.

Figure 5:
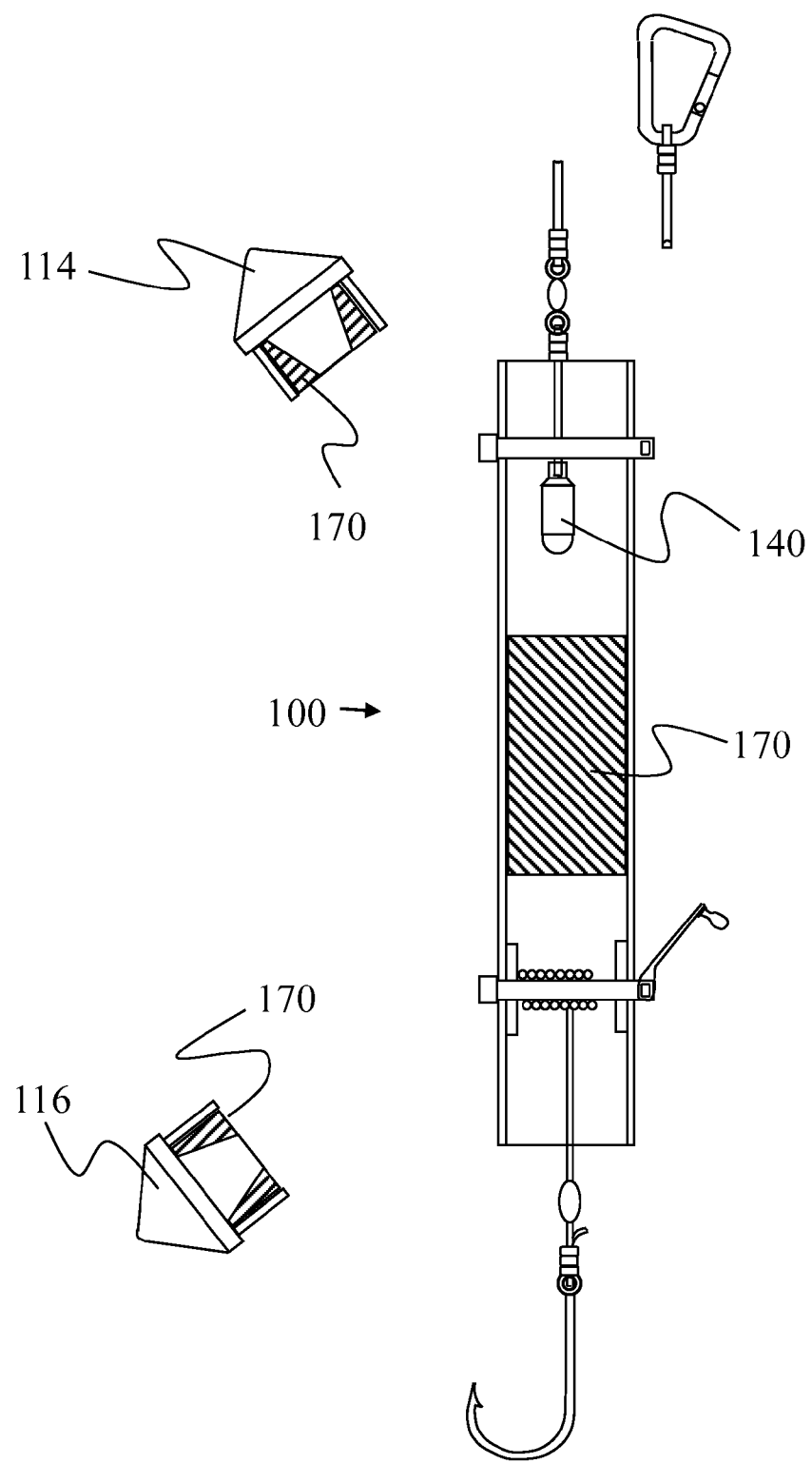
FIG. 5 is a cross sectional view of another embodiment of the fish set line apparatus along the line 4-4 of FIG. 3.
Figure 6:
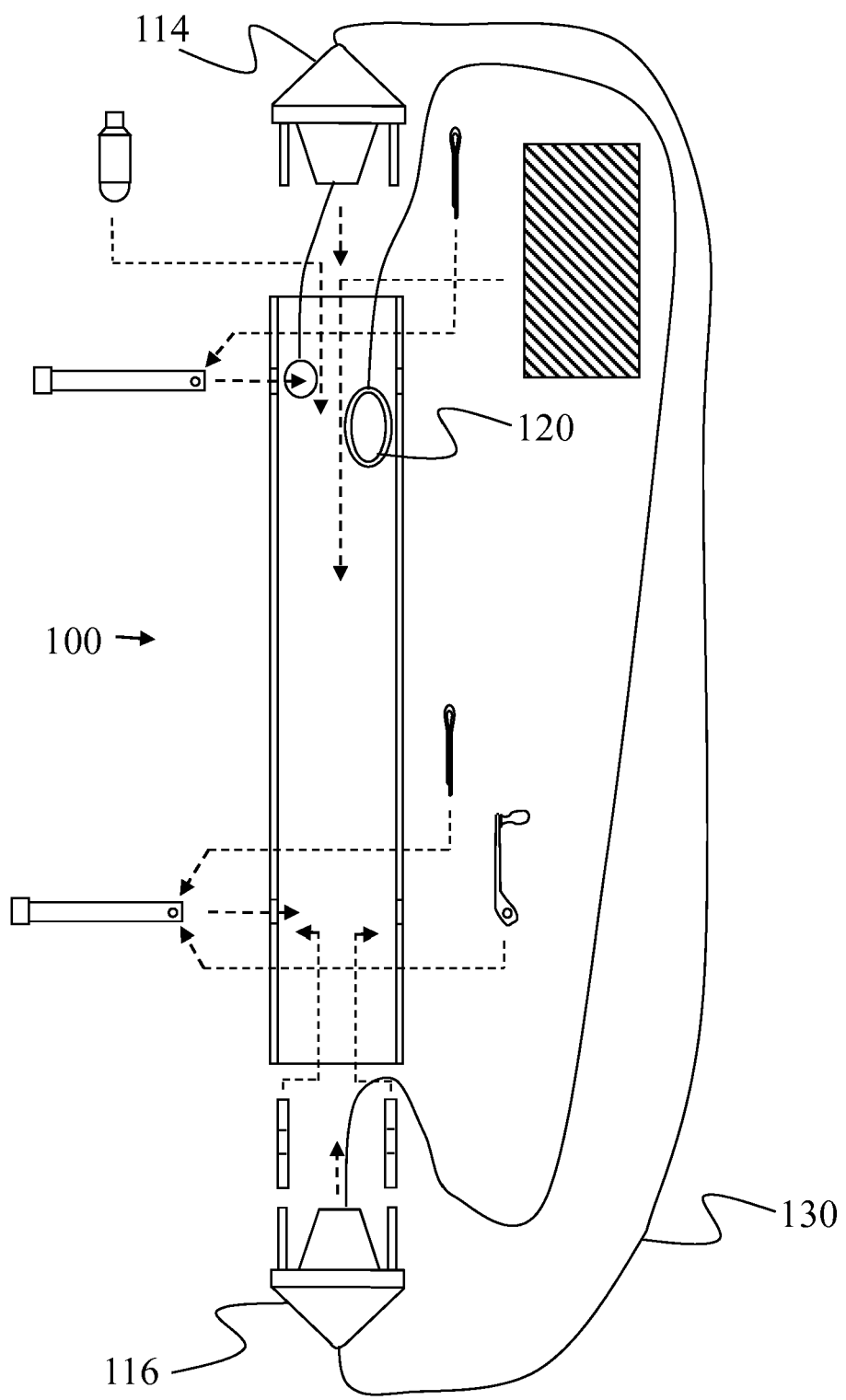
FIG. 6 is a cross sectional view along the line 4-4 of FIG. 3 of one embodiment of the present invention depicting the assembly of caps, shafts, carter pins, flotation material, and handle.
Figures 7A, 7B, 7C:
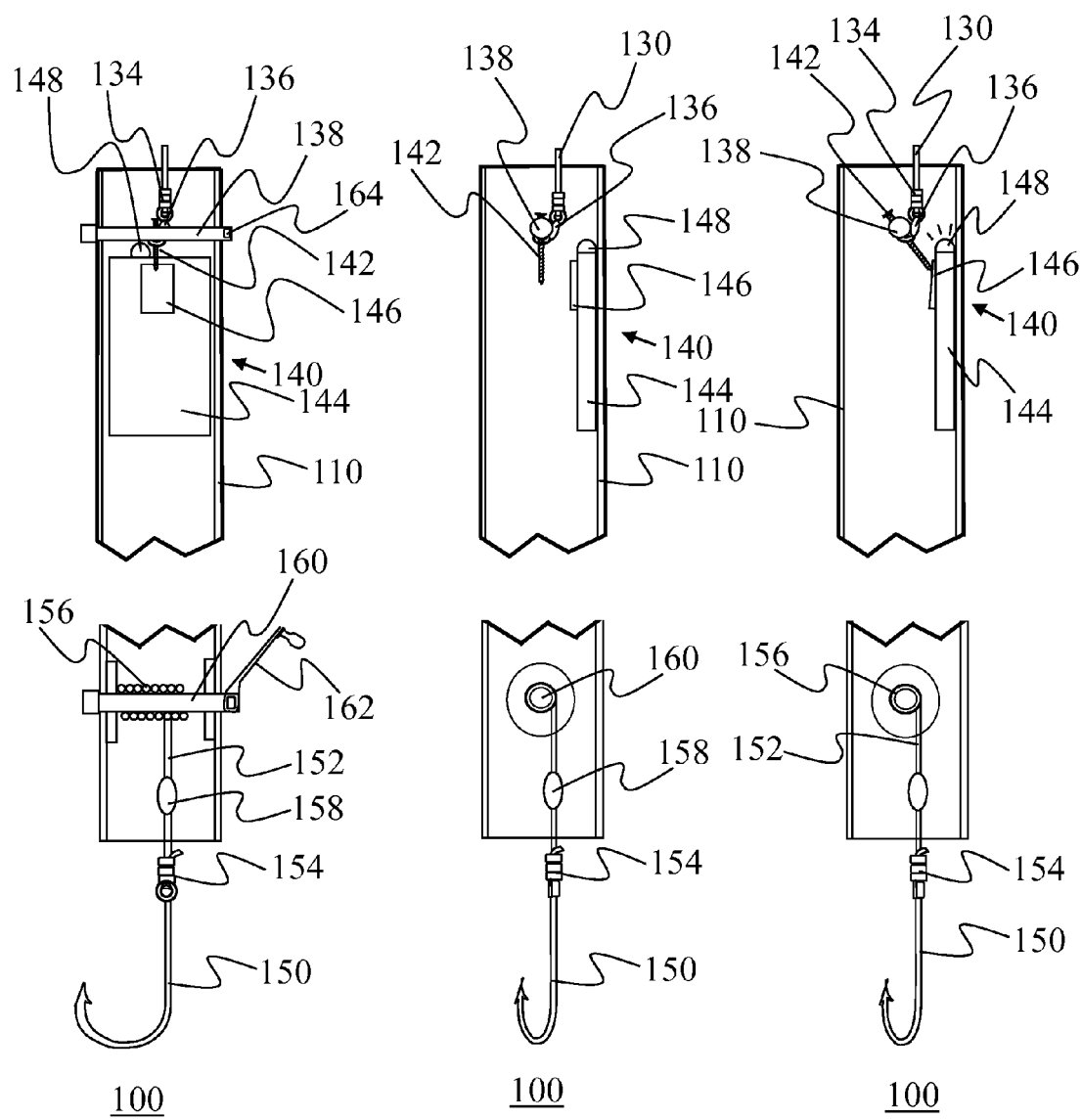
FIG. 7A is a cross sectional view of another embodiment of the fish set line apparatus along the line 4-4 of FIG. 3 depicting motion activated light means.
FIG. 7B is a cross sectional view of another embodiment of the fish set line apparatus along the line 7-7 of FIG. 2 depicting motion activated light means without activation.
FIG. 7C is a cross sectional view of another embodiment of the fish set line apparatus along the line 7-7 of FIG. 2 depicting motion activated light means activated.

In another embodiment, the fish set line 100 further includes a buoyant means 170 to float the fish set line apparatus 100 should the fish set line apparatus 100 drop into the water. As depicted in FIG. 5, the buoyant means 170 may be included in the housing means 110 and the top cap 114 and the bottom cap 116. The buoyant means 170 may include but is not limited to any floatable means such as an air pocket or a material such as foam, STYROFOAM, or cork. The buoyant means 170 may include but is not limited to being formed during manufacture by including a small bladder or air pocket in the housing means 110 or in the caps 114, 116; being foam sprayed into a portion of the housing means 110 or the caps 114, 116; or being foam cut to shape and pressed or glued into a portion of the housing means 110 or caps 114, 116.

Figure 4:
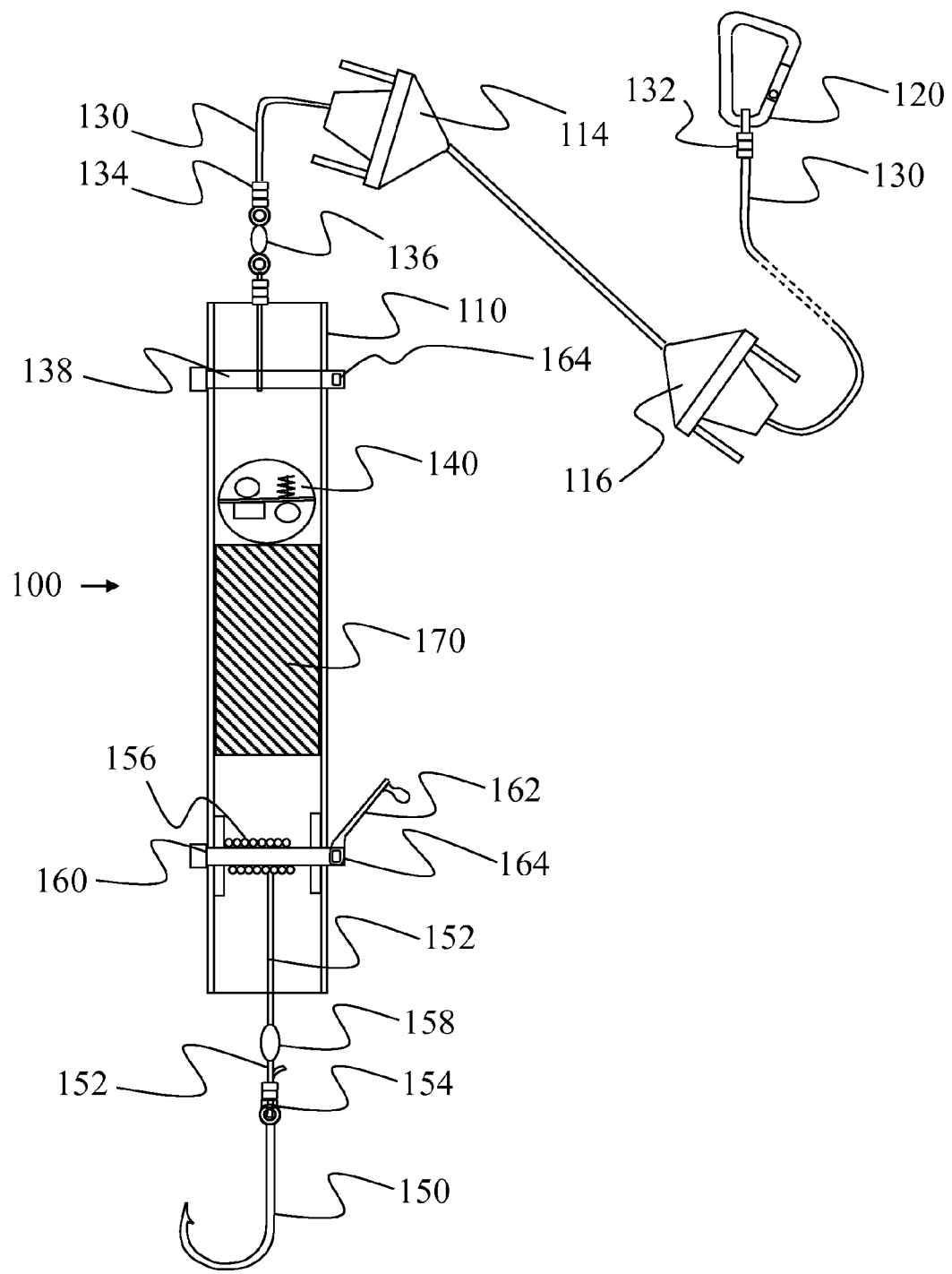
FIG. 4 is a cross sectional view of one embodiment of the fish set line apparatus along the line 4-4 of FIG. 3.

As shown in FIG. 4, the attachment means 120 may include but is not limited to a clip, or a biner. The attachment means 120 may be numerous types of attachment clips know to those skilled in the art. These attachment means 120 is used for attaching the fish set line apparatus 100 to a fixed structure including but not limited to a tree limb or a branch. The attachment means 120 may include numerous kinds of locking clips and are not limited to but include biners, round wire with a nut as commonly used as key chains, a screw on a spring, clips, sheet metal clips, and hooks. A typical attachment means 120 may be 1 to 2 inches in size or a size that will store in the housing means 110.

The attachment line 130 is wrapped around the tree limb or object for securing the fish set line 100 and the attachment means 120 on the first end of the attachment line 132 is then hooked or attached around the attachment line 130 extending from the housing means 110. There is more holding advantage and less force is placed on the attachment means 120 by wrapping the attachment line 130 in this manner. In addition, this allows for attaching to multi-size diameter limbs, structures, or secure objects. The attachment line 130 and the hook line 152 may be any string or line that does not easily tangle. It has been found that #18 Nylon braded twine with 155 pound tensile strength is one of many lines that works well as well as #18 Nylon twine. Fishing line that does not tangle is another alternative. A coating on the twine may enhance the operation of the lines. The swivel 136 may be attached with the attachment line 130 anywhere between the housing means 110 and the attachment means 120 to maintain the horizontal alignment of the fish set line 100. The swivel 136 may be spliced into the attachment line 130 or the swivel 136 may be attached with the housing 110 and with a second end of the attachment line 134. The swivel 136 may attach with the housing means 110 with an upper shaft 138 that goes through the housing means 110 forming an attachment point. The upper shaft 138 may be held in place on the housing means 110 with a carter pin 164, a hair pin, or a removable locking device means. In one embodiment the swivel 136 may also hook through a hole in the motion activated light means 140 so that the swivel 136 holds the attachment line 130, housing means 110, and motion activated light means 140 with the upper shaft 138. In another embodiment a leverage screw 142 may be included wherein the leverage screw 142 attaches through the upper shaft 138 and through the one eye of the swivel 136. The other eye of the swivel is attached with the second end of the attachment line 134. In a preferred embodiment the leverage screw comprises a one inch dry wall screw and the swivel comprises a coast lock snap swivel with a size of 1 to 2/0 however numerous types of swivels may be used.

The locking crank means 162 may include but is not limited to a locking handle where the handle pivots into a single hole or a slot made from adjoining multiple size holes in the housing 110 for locking The locking prevents the line from extending when a fish is caught. A carter pin 164, a hair pin, a sold pin, or a locking device means may hold the handle 162 in place with the hook line shaft 160 on the housing means 110. In another embodiment, the locking crank or handle means 162 may be a round knob that is spring loaded into a countersink recess to lock when in recess and pull out to turn the knob to extend or retract the hook line 152.

The hook 150 may be any size that will fit within the housing means 110. The 6/0 hook 150 has been found to work well for the limbline application. The weight 158 may be any size or type of weight. One to one and one half ounce egg sinker weights are one example of a weight 158 that has worked well.

The motion activated light means 140 may be numerous types of motion lights know to those skilled in the art. This motion activated light means 140 is used for activating a light when a particular motion range is detected. The motion detected would be a rapid acceleration motion with more force created by a fish hitting a hook with bait and the fish struggling with the hook 150 and hook line 152 verses a smooth slow acceleration with less force that would be created by water wave action or the wind. As depicted in FIGS. 4 & 5, the motion activated light means 140 may include but is not limited to tire plug motion lights such as U.S. Pat. No. 6,467,939 issued to Deutsch et al. or motion activated lights in toys, shoes, or other devices on the market. Typically, this motion activated light means 140 will include a battery, at least one LED light, a motion activation device to activate when motion acceleration is detected, an integrated circuit to turn the light on when the motion acceleration is detected and turn the light off after a specific interval. This embodiment may include a motion activated light means 140 including a case 144, a switch, a wiring circuit, a battery, and a light 148. The case, the switch, the wiring circuit, the battery, and the light are operationally connected such that the light 148 is illuminated when motion is detected by the switch. The motion activated light means 140 is attached with the inside of the housing 110. The motion activated light means 140 is operationally connected with the housing 110. When a fish pulls on the hook 150, the hook pulls on the hook line 152, the hook line pulls on the hook line shaft 160, the hook line shaft pulls on the housing 110, and the housing moves the switch and activates the light 148. The motion activated light means 140 detects motion related to fish engagement verses wave action from the water and alert the fisherman of a fish catch. The motion activation device may be as simple as a spring that contacts a pin inside the diameter of the spring to complete an electrical circuit. Similar to this is still another embodiment of a fish set line wherein the motion activated light means 140 comprises a motion sensitive switch comprising a switch contact electrically connected to a pole of the power source. The switch contact is positioned suspended adjacent a contact plate. Movement of the wheel light causes the switch contact to vibrate sufficiently to touch the contact plate, thereby closing the electrical circuit and energizing the light source. When movement of wheel light ceases, vibration of the switch contact is reduced and eventually stops, the switch contact moves away from the contact plate, and the electrical circuit is opened, turning off the light source. In this embodiment the switch contact is preferably a spring coil formed from a wire which is electrically connected to the lower pole of the power source. The vibrational characteristics of switch contact depend on factors known in the art, such as the gauge of wire used to make the spring coil, the number of coils in the spring, the tensile strength of the wire and, therefore, its bendability. Careful control of such characteristics will allow fabrication of a switch contact of predetermined sensitivity to motion, and of predetermined residual contact after motion stops. An integrated circuit positioned on circuit board may also be configured for controlling the rate at which the light source is energized. For example, the integrated circuit can minimize the energizing of the light source due to random movement such as experienced during shipment of the wheel light. Additionally, the integrated circuit could be configured to provide a low power use mode responsive to random movement of the wheel light, thereby helping conserve energy in the power source. Yet another embodiment of the fish set line 100 includes as previously noted the swivel 136, the leverage screw 142, and the upper shaft 138 wherein the upper shaft 138 is attached with the housing 110, and the leverage screw 142 attaches through the upper shaft 138 and through a first eye of the swivel 136, and a second eye of the swivel 136 attaches with the attachment line 130 such that the swivel 136 is disposed between the housing 140 and the attachment means 120. The swivel 136 maintains horizontal alignment of the fish set line 110. In this embodiment, the motion activation light means 140 further includes a case 144, a push on and release off switch 146, a wiring circuit, a battery, and a light 148. The case 144, the switch 146, the wiring circuit, the battery, and the light 148 are operationally connected such that the light 148 is illuminated while pressure is maintained on the switch 146. The motion activated light means 140 is attached with the inside of the housing 110. The motion activated light means 140 is operationally connected with the leverage screw 142 such that as a fish pulls on the hook 150, the hook pulls on the hook line 152, the hook line pulls on the hook line shaft 160, the hook line shaft pulls on the housing 110, the housing pulls on the upper shaft 138, the upper shaft turns from the leverage from the attachment line 130 and the swivel 136 allowing the leverage screw 142 to rotate such that leverage screw 142 contacts the switch 146 and activates the light 148. When the fish no longer pulls on the hook 150, the pressure is released and the switch 146 is released and the light 148 is deactivated. The arrangement of the leverage screw 142 and the swivel eye 136 determine the amount of force from the fish transferred to the switch 146. The leverage screw 142 may be adjusted to adjust the sensitivity of the fish set line activation. In addition, the sensitivity of the activation of the light 148 may be adjusted by changing the motion activated light means switch 146. The less pressure to activate the switch 146 the more sensitive the fish set line for smaller fish and the more pressure to activate the switch 146 the less sensitive the fish set line for larger fish. The motion activated light means 140 will detect motion related to fish engagement verses wave action from the water and alert the fisherman of a fish catch. In one embodiment, the motion activated light means 140 may be attached to the wall of the housing 110 with hot glue approximately 1⅛ inches below the top inside the housing 110 with the light 148 upward. The upper shaft 138 may comprise a nylon pin and the leverage screw 142 may comprise a 1 inch screw with the screw through the center of the nylon pin and the swivel 136 attached on one end of the attachment line 134 with the other end of the attachment line 134 connected with a limb. The screw holds the swivel 136 that pulls the screw 142 into the light 148, the pressure activates the light 148, and the screw 142 adjusts by leverage the pressure that it takes to activate the light 148.

The motion activation light means 140 is inexpensive and easily replaceable by removing the upper shaft 138 and/or the swivel 136.

Manner of Use:

The method for using the fish set line may vary depending upon the embodiment. In one embodiment the method of fishing using a fish set line comprises the steps of: removing the top cap of a fish set line; removing the bottom cap of the fish set line; extending the attachment means from the housing; connecting the attachment means to fixed structure including wrapping the attachment line around an object and securing the fish set line to the object; extending hook and hook line from the housing by reeling out the proper amount of hook line; baiting the hook; and monitoring the motion activation light means.

Another embodiment of a method using the fish set line includes the steps of: getting to the fishing spot; finding a limb or branch; removing the caps of the fish set line; dipping the bottom portion of the fish set line in the water to wet the hook line; wrapping the attachment line around the limb or branch several times; fastening the attachment means to the attachment line after wrapping; spooling out the length of hook line needed; baiting the hook; dropping the line in the water; locking the cranking means or handle. Steps for bringing in the fish include: seeing the fish bite alert; pulling up the line without using the crank to retrieve the fish; removing the fish; re-baiting the hook; and replacing the hook with bait in the water. Steps for storing the fish set line include: winding the hook line into the housing means of the fish set line; replacing the hook, hook line, and weight into the lower portion of the fish set line; replacing the bottom cap on the housing means; removing the attachment line from the limb or branch; replacing the attachment line and attachment means in the top portion of the housing means; and replacing the top cap in the upper portion of the housing means.

Uniqueness:

The present invention is a limb line fishing device that gives a visual signal when struck by a fish. This is for the fisherman to be able to retrieve the fish quick to determine if the fish is keepable or not. Fish to small can be released back into the lake without harm. This is unlike other limb line devices that remove the fish from the water killing it or lines that get forgot and unattended. The LED light will illuminate to allow every line to be checked and retrieved.

The tube casing allows the fisherman to write their name and information right on the case. The case caps at both ends keep everything neatly together. Furthermore, the device is made to float if dropped accidentally into the water. It does not sink to the bottom, get tangled or litter the water.

Using this device is very simple. Uncap both ends and dip the bottom end into the water. This allows the line to get wet making it easier to wind. Take the top binder string or attachment line and wrap it at least 2 times around a limb snapping the binder to the line. By wrapping the attachment line around the limb it places the weight of the fish on the limb and not on the line. Unsnap the handle to wheel out the bottom hook line with the hook. Bait the hook and set the length of hook line to the depth you desire. Resnap the handle locking the hook line into that length. When the fish takes the bait it will shake the casing setting off the LED light. Pull the hook line in (line is not made to wheel fish up) and net the fish. Remove the hook from the fish; either keep or turn the fish loose. Rebait and reset the hook line to catch more fish. If finished fishing wheel hook line up into the case and cap. Unsnap binder line, replace binder line into the case and cap.

What is claimed is:

1. A fish set line comprising:
   a housing for enclosing the fish set line;
   a first line being an attachment line including a first attachment line end, and a second attachment line end, wherein the first attachment line end is attached with the housing;
   an attachment means attached with the second attachment line end for attaching the fish set line with a fixed structure to secure the fish set line;
   a swivel, a leverage screw, and an upper shaft wherein the upper shaft is attached with the housing, and the leverage screw attaches through the upper shaft and through a first eye of the swivel, and a second eye of the swivel attaches with the attachment line such that the swivel is disposed between the housing and the attachment means, whereby the swivel maintains horizontal alignment of the fish set line;
   a motion activated light means including a case, a push on and release off switch, a wiring circuit, a battery, and a light wherein the case, the switch, the wiring circuit, the battery, and the light are operationally connected such that the light is illuminated while pressure is maintained on the switch and wherein the motion activated light means is attached with the inside of the housing and the motion activated light means is operationally connected with the leverage screw wherein a fish pulls on the hook, the hook pulls on the hook line, the hook line pulls on the hook line shaft, the hook line shaft pulls on the housing, the housing pulls on the upper shaft, the upper shaft turns from the leverage screw from the attachment line and the swivel allowing the leverage screw to rotate such that leverage screw contacts the switch and activates the light whereby the motion activated light means will detect motion related to fish engagement verses wave action from the water and alert the fisherman of a fish catch;
   a fish hook;
   a second line being a hook line including a first end of the hook line wherein the first hook line end is attached to the fish hook;
   a weight attached with the hook line near the hook whereby the weight weights the line down in the water;
   a hook line shaft attached with the housing means wherein a second end of the hook line attaches with the hook line shaft; and
   a locking crank means attached with the hook line shaft such that the locking crank means reels in the hook line and secures the hook line in place.

2. A fish set line as set forth in claim 1 wherein:
   the attachment means comprises a clip attached with the attachment line end whereby the attachment line may loop around an object such as a tree branch with the clip attaching again with the attachment line for securing the fish set line to the object;
   the housing further comprises PVC rectangular tubing for housing the fish set line, a top removable cap and a bottom removable cap whereby the housing may enclose the attach line, the hook line, the hook, the weight, the swivel, and the clip when storing and transporting the fish set line;
   the housing comprises a buoyant means inside the housing to provide positive buoyancy for the fish set line should the fish set line fall into the water; and
   the locking crank means comprises a crank handle attached with the hook line shaft.

3. A fish set line as set forth in claim 2 wherein:
   the clip further comprises a biner for attaching with a limb of a tree; and
   the top cap and the bottom cap further comprises an aperture in the top cap and the bottom cap such that the attachment line may be disposed through the aperture in the top cap and the bottom cap wherein the top cap and the bottom cap remain attached with the fish set line when removed from the housing and such that the attachment line may be used as a handle for carrying the fish set line.

4. A fish set line comprising:
   a housing for enclosing the fish set line;
   a first line being an attachment line including a first attachment line end, and a second attachment line end, wherein the first attachment line end is attached with the housing;
   a clip attached with the second attachment line end for attaching the fish set line with a fixed structure to secure the fish set line;
   a swivel and an upper shaft wherein the upper shaft is attached with the housing and the swivel attaches with a first eye of the swivel, and a second eye of the swivel attaches with the attachment line such that the swivel is disposed between the housing and the clip, whereby the swivel maintains horizontal alignment of the fish set line;
   a motion activated light means including a case, a switch, a wiring circuit, a battery, and a light wherein the case, the switch, the wiring circuit, the battery, and the light are operationally connected such that the light is illuminated when motion is detected by the switch and wherein the motion activated light means is attached with the inside of the housing and the motion activated light means is operationally connected with the housing wherein a fish pulls on the hook, the hook pulls on the hook line, the hook line pulls on the hook line shaft, the hook line shaft pulls on the housing, the housing moves the switch and activates the light whereby the motion activated light means detects motion related to fish engagement verses wave action from the water and alert the fisherman of a fish catch;
   a fish hook;
   a second line being a hook line including a first end of the hook line wherein the first hook line end is attached to the fish hook;
   a weight attached with the hook line near the hook whereby the weight weights the line down in the water;
   a hook line shaft attached with the housing wherein a second end of the hook line attaches with the hook line shaft; and a locking crank means attached with the hook line shaft such that the locking crank means reels in the hook line and secures the hook line in place.

5. A fish set line as set forth in claim 4 wherein:

the motion activated light means switch comprises a spring and a pin wherein the pull of the fish moves the spring such that the spring contacts the pin inside the diameter of the spring to complete an electric circuit and activate the light;

the housing further comprises PVC rectangular tubing for housing the fish set line, a top removable cap and a bottom removable cap whereby the housing may enclose the attach line, the hook line, the hook, the weight, the swivel, and the clip when storing and transporting the fish set line;

the clip further comprises a biner for attaching with a limb of a tree; and the locking crank means comprises a crank handle attached with the hook line shaft.

6. A fish set line as set forth in claim 5 wherein:

the top cap and the bottom cap further comprises an aperture in the top cap and the bottom cap such that the attachment line may be disposed through the aperture in the top cap and the bottom cap wherein the top cap and the bottom cap remain attached with the fish set line when removed from the housing and such that the attachment line may be used as a handle for carrying the fish set line.

\* \* \* \* \*